United States Patent
Chen et al.

(10) Patent No.: US 12,407,418 B2
(45) Date of Patent: Sep. 2, 2025

(54) SIGNAL PROCESSING SYSTEM AND SIGNAL PROCESSING METHOD WHERE A PROTOCOL ANALYSIS CIRCUIT IS USED TO SIMPLIFY HARDWARE STRUCTURE AND REDUCE POWER CONSUMPTION

(71) Applicant: Gemtek Technology Co., Ltd., Hsinchu (TW)

(72) Inventors: Hung-Wen Chen, Hsinchu (TW); Chih-Sien Yao, Hsinchu (TW); Chun-Yu Chen, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 259 days.

(21) Appl. No.: 18/369,826

(22) Filed: Sep. 18, 2023

(65) Prior Publication Data
US 2024/0154703 A1    May 9, 2024

Related U.S. Application Data

(60) Provisional application No. 63/422,437, filed on Nov. 4, 2022.

(51) Int. Cl.
*H04B 10/40* (2013.01)
*H04B 10/25* (2013.01)

(52) U.S. Cl.
CPC ............. *H04B 10/40* (2013.01); *H04B 10/25* (2013.01)

(58) Field of Classification Search
CPC .............................. H04B 10/25; H04B 10/40
USPC ........................................................... 398/115
See application file for complete search history.

(56) References Cited

U.S. PATENT DOCUMENTS

| 8,139,947 B2 * | 3/2012 | Ojima | H04J 3/0688 |
| | | | 398/154 |
| 11,431,432 B2 * | 8/2022 | Soto | H04J 14/0267 |
| 11,770,204 B1 * | 9/2023 | Zhang | H04J 14/0298 |
| | | | 398/72 |
| 2023/0327770 A1 * | 10/2023 | Lei | H04Q 11/0067 |
| | | | 398/43 |

FOREIGN PATENT DOCUMENTS

| CN | 113922880 A | 1/2022 |
| CN | 111698582 B | 3/2022 |
| CN | 112640481 B | 9/2022 |
| CN | 115173946 A | 10/2022 |

* cited by examiner

*Primary Examiner* — Dalzid E Singh
(74) *Attorney, Agent, or Firm* — Winston Hsu

(57) ABSTRACT

A signal processing system includes a first transceiver unit, a second transceiver unit, a protocol analysis circuit, a system chip, and a network unit. The first transceiver unit can transceive a first optical signal and a first electrical signal. The second transceiver unit can transceive a second optical signal and a second electrical signal. The protocol analysis circuit can process the first electrical signal and an analysis signal related to the first optical signal. The system chip can process the analysis signal, the second electrical signal, a first operation signal and a second operation signal. The network unit can transceive the first operation signal and the second operation signal, and transceive a first network signal and a second network signal between the network unit and a user device. The system chip and the network unit can process signals related to the first optical signal and the second optical signal.

14 Claims, 6 Drawing Sheets

US 12,407,418 B2

SIGNAL PROCESSING SYSTEM AND SIGNAL PROCESSING METHOD WHERE A PROTOCOL ANALYSIS CIRCUIT IS USED TO SIMPLIFY HARDWARE STRUCTURE AND REDUCE POWER CONSUMPTION

CROSS REFERENCE TO RELATED APPLICATIONS

This application claims the benefit of U.S. Provisional Application No. 63/422,437, filed on Nov. 4, 2022. The content of the application is incorporated herein by reference.

BACKGROUND OF THE INVENTION

1. Field of the Invention

The application is related to a signal processing system and signal processing method, and more particularly, a signal processing system and signal processing method where a protocol analysis circuit is used to simplify hardware structure and reduce power consumption.

2. Description of the Prior Art

As the demand for high-speed data transmissions increases, communication technology has also developed accordingly. At present, a passive optical network (PON) can be used for data transmissions through optical fibers. For example, a gigabit passive optical network (GPON) can be used in the communication field for high-speed data transmissions.

However, because of the limitations of related hardware and software, when the data transmissions of two passive optical networks of two different speeds are needed for an application, two sets of different hardware must be used. For example, if a user needs to perform data transmissions of 2.5 gigabits per second (2.5 Gbps) and 10 gigabits per second (10 Gbps), data transmissions of 2.5 gigabits per second (2.5 Gbps) need dedicated transceiver unit, laser driver, system on chip, memory and network unit; and data transmissions of 10 gigabits per second (10 Gbps) need another set of dedicated transceiver unit, laser driver, system on chip, memory and network unit. Therefore, it is difficult to reduce the complexity and power consumption of the system. In the field, a suitable solution is in need to simplify hardware requirements.

SUMMARY OF THE INVENTION

An embodiment provides a signal processing system including a first transceiver unit, a second transceiver unit, a protocol analysis circuit, a system chip and a network unit. The first transceiver unit is configured to transceive a first optical signal and a first electrical signal. The second transceiver unit is configured to transceive a second optical signal and a second electrical signal. The protocol analysis circuit is coupled to the first transceiver unit, and configured to process the first electrical signal and an analysis signal and transceive the first electrical signal and the analysis signal. The system chip is coupled to the protocol analysis circuit and the second transceiver unit, and configured to process the analysis signal, the second electrical signal, a first operation signal and a second operation signal, and transceive the analysis signal, the second electrical signal, the first operation signal and the second operation signal. The network unit is coupled to the system chip and a user device, and configured to transceive the first operation signal and the second operation signal, and transceive a first network signal and a second network signal between the network unit and the user device. The first electrical signal, the analysis signal, the first operation signal and the first network signal are corresponding to the first optical signal. The second electrical signal, the second operation signal and the second network signal are corresponding to the second optical signal.

Another embodiment provides a signal processing method for a signal processing system. The signal processing system can include a first transceiver unit, a second transceiver unit, a protocol analysis circuit, a system chip and a network unit. The signal processing method can include using the first transceiver unit to transceive a first optical signal and a first electrical signal corresponding to the first optical signal, using the second transceiver unit to transceive a second optical signal and a second electrical signal corresponding to the second optical signal, using the protocol analysis circuit to transceive the first electrical signal and an analysis signal corresponding to the first electrical signal, and process the first electrical signal and the analysis signal, using the system chip to transceive the analysis signal, a first operation signal corresponding to the analysis signal, the second electrical signal, and a second operation signal corresponding to the second electrical signal, and process the analysis signal, the first operation signal, the second electrical signal and the second operation signal, and using the network unit to transceive the first operation signal, the second operation signal, a first network signal corresponding to the first operation signal, and a second network signal corresponding to the second operation signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
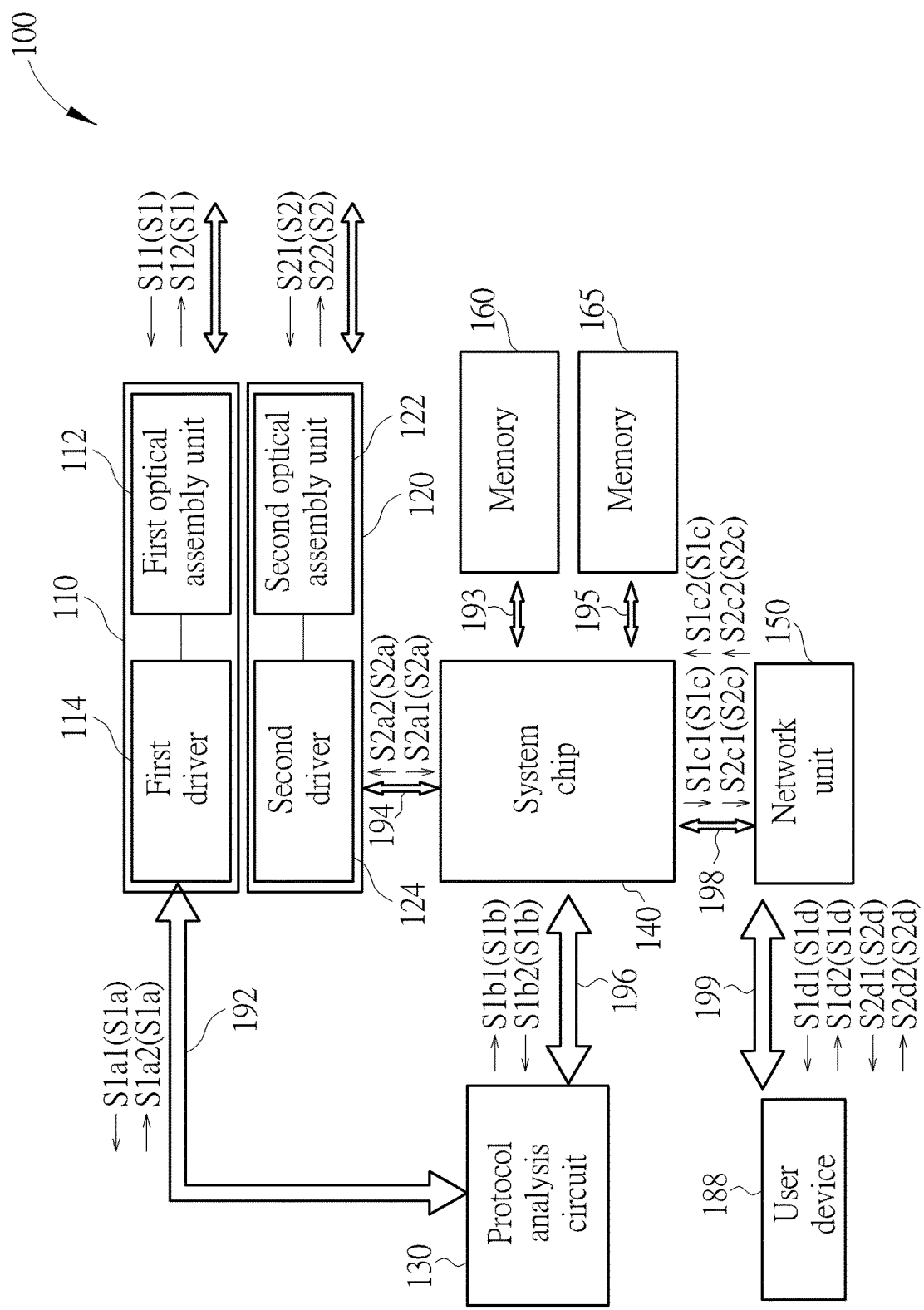
FIG. 1 illustrates a signal processing system according to an embodiment.

FIG. 1 illustrates a signal processing system 100 according to an embodiment. The signal processing system 100 can be used to transceive signals of two different bit rates, as described below.

The signal processing system 100 can include a first transceiver unit 110, a second transceiver unit 120, a protocol analysis circuit 130, a system chip 140, and a network unit 150.

The first transceiver unit 110 can be used to transceive a first optical signal S1 and a first electrical signal S1a. The second transceiver unit 120 can be used to transceive a second optical signal S2 and a second electrical signal S2a. The protocol analysis circuit 130 can be coupled to the first transceiver unit 110 and used to transceive and process the first electrical signal S1a and an analysis signal S1b. The system chip 140 can be coupled to the protocol analysis circuit 130 and the second transceiver unit 120 and used to transceive and process the analysis signal S1b, the second electrical signal S2a, a first operation signal S1c and a second operation signal S2c. According to embodiments, the system chip 140 can include a system on chip (SoC) and/or a processor. The network unit 150 can be coupled to the system chip 140 and a user device 188 and used to transceive the first operation signal S1c and the second operation signal S2c and transceive a first network signal S1d and a second network signal S2d between the network unit 150 and the user device 188. According to embodiments, the network unit 150 can be an Ethernet unit.

In FIG. 1, the first electrical signal S1a, the analysis signal S1b, the first operation signal S1c and the first network signal S1d can be corresponding to the first optical signal S1; and the second electrical signal S2a, the second operation signal S2c and the second network signal S2d can be corresponding to the second optical signal S2, as shown in Table 1.

TABLE 1

| Signals related to the first optical signal S1 | The first electrical signal S1a<br>The analysis signal S1b<br>The first operation signal S1c<br>The first network signal S1d |
|---|---|
| Signals related to the second optical signal S2 | The second electrical signal S2a<br>The second operation signal S2c<br>The second network signal S2d |

The first optical signal S1 can be corresponding to a first bit rate, and the second optical signal S2 can be corresponding to a second bit rate lower than the first bit rate. For example, the first bit rate can be 10 Gigabits per second (Gbps), and the second bit rate can be 2.5 Gbps. This is an example, and embodiments are not limited thereto.

As shown in FIG. 1, the first transceiver unit 110 can include a first optical assembly unit 112 and a first driver 114. The first optical assembly unit 112 can be used to transceive the first optical signal S1. The first driver 114 can be coupled to the first optical assembly unit 112, and used to convert the first optical signal S1 to the first electrical signal S1a and convert the first electrical signal S1a to the first optical signal S1. The second transceiver unit 120 can include a second optical assembly unit 122 and a second driver 124. The second optical assembly unit 122 can be used to transceive the second optical signal S2. The second driver 124 can be coupled to the second optical assembly unit 122, and used to convert the second optical signal S2 to the second electrical signal S2a and convert the second electrical signal S2a to the second optical signal S2. For example, each of the first optical assembly unit 112 and the second optical assembly unit 122 can include a bi-directional optical sub-assembly (BOSA). For example, each of the first driver 114 and the second driver 124 can include a laser driver used to perform conversion between an optical signal and an electrical signal.

As shown in FIG. 1, the signal processing system 100 can further include a memory 160 coupled to the system chip 140 and used to perform a queue operation related to the second electrical signal S2a and the second operation signal S2c. The queue operation of the memory 160 is not related to the first optical signal S1 and the first electrical signal S1a. In other words, when the signal processing system 100 is used to process the first optical signal S1 and the signals related to the first optical signal S1, the memory 160 is not used, and more details are described below. According to embodiments, the memory 160 can include a dynamic random-access memory (DRAM). For example, the memory 160 can include a double data rate (DDR) memory.

As shown in FIG. 1, the signal processing system 100 can further include a memory 165 coupled to the system chip 140. For example, the memory 165 can include a flash memory used to store programs and parameters related to a boot process.

According to embodiments, the signal processing system 100 can further include a first optical network unit (ONU) interface 192, a second optical network unit interface 194, a port physical layer (PHY) interface 196, a first network interface 198 and a second network interface 199.

As shown in FIG. 1, the first optical network unit interface 192 can be disposed between the first transceiver unit 110 and the protocol analysis circuit 130 for transceiving the first electrical signal S1a. The second optical network unit interface 194 can be disposed between the second transceiver unit 120 and the system chip 140 for transceiving the second electrical signal S2a. The port physical layer interface 196 can be disposed between the protocol analysis circuit 130 and the system chip 140 for transceiving the analysis signal S1b. The first network interface 198 can be disposed between the system chip 140 and the network unit 150 for transceiving the first operation signal S1c and the second operation signal S2c. The second network interface 199 can be disposed between the network unit 150 and the user device 188 for transceiving the first network signal S1d and the second network signal S2d. For example, the bit rate of the first network interface 198 can be 10 Gbps, and the first network interface 198 can be an XFI interface (e.g. Ziffy interface). For example, the second network interface 199 can be an RJ45 interface.

The signal processing system 100 can further include a first memory interface 193 and a second memory interface 195. The first memory interface 193 can be disposed between the system chip 140 and the memory 160. The second memory interface 195 can be disposed between the system chip 140 and the memory 165. For example, the first memory interface 193 can be a double data rate (DDR) interface, and the second memory interface 195 can be a serial peripheral interface (SPI).

As shown in FIG. 1, the first optical signal S1 can include a signal S11 and a signal S12. The signal S11 can be transmitted from outside of the signal processing system 100 to the first transceiver unit 110. The signal S12 can be transmitted from the first transceiver unit 110 to outside of the signal processing system 100. In other words, the first transceiver unit 110 can be used to receive the signal S11 or transmit the signal S12.

The second optical signal S2 can include a signal S21 and a signal S22. The signal S21 can be transmitted from outside of the signal processing system 100 to the second transceiver unit 120. The signal S22 can be transmitted from the second transceiver unit 120 to outside of the signal processing system 100. In other words, the second transceiver unit 120 can be used to receive the signal S21 or transmit the signal S22.

The first electrical signal S1a can include a signal S1a1 and a signal S1a2. The signal S1a1 can be transmitted from the first transceiver unit 110 to the protocol analysis circuit 130. The signal S1$a$2 can be transmitted from the protocol analysis circuit 130 to the first transceiver unit 110.

The second electrical signal S2$a$ can include a signal S2$a$1 and a signal S2$a$2. The signal S2$a$1 can be transmitted from the second transceiver unit 120 to the system chip 140. The signal S2$a$2 can be transmitted from the system chip 140 to the second transceiver unit 120.

The analysis signal S1$b$ can include a signal S1$b$1 and a signal S1$b$2. The signal S1$b$1 can be transmitted from the protocol analysis circuit 130 to the system chip 140. The signal S1$b$2 can be transmitted from the system chip 140 to the protocol analysis circuit 130.

The first operation signal S1$c$ can include a signal S1$c$1 and a signal S1$c$2. The signal S1$c$1 can be transmitted from the system chip 140 to the network unit 150. The signal S1$c$2 can be transmitted from the network unit 150 to the system chip 140.

The second operation signal S2$c$ can include a signal S2$c$1 and a signal S2$c$2. The signal S2$c$1 can be transmitted from the system chip 140 to the network unit 150. The signal S2$c$2 can be transmitted from the network unit 150 to the system chip 140.

The first network signal S1$d$ can include a signal S1$d$1 and a second S1$d$2. The signal S1$d$1 can be transmitted from the network unit 150 to the user device 188. The signal S1$d$2 can be transmitted from the user device 188 to the network unit 150.

The second network signal S2$d$ can include a signal S2$d$1 and a second S2$d$2. The signal S2$d$1 can be transmitted from the network unit 150 to the user device 188. The signal S2$d$2 can be transmitted from the user device 188 to the network unit 150.

Figure 2:
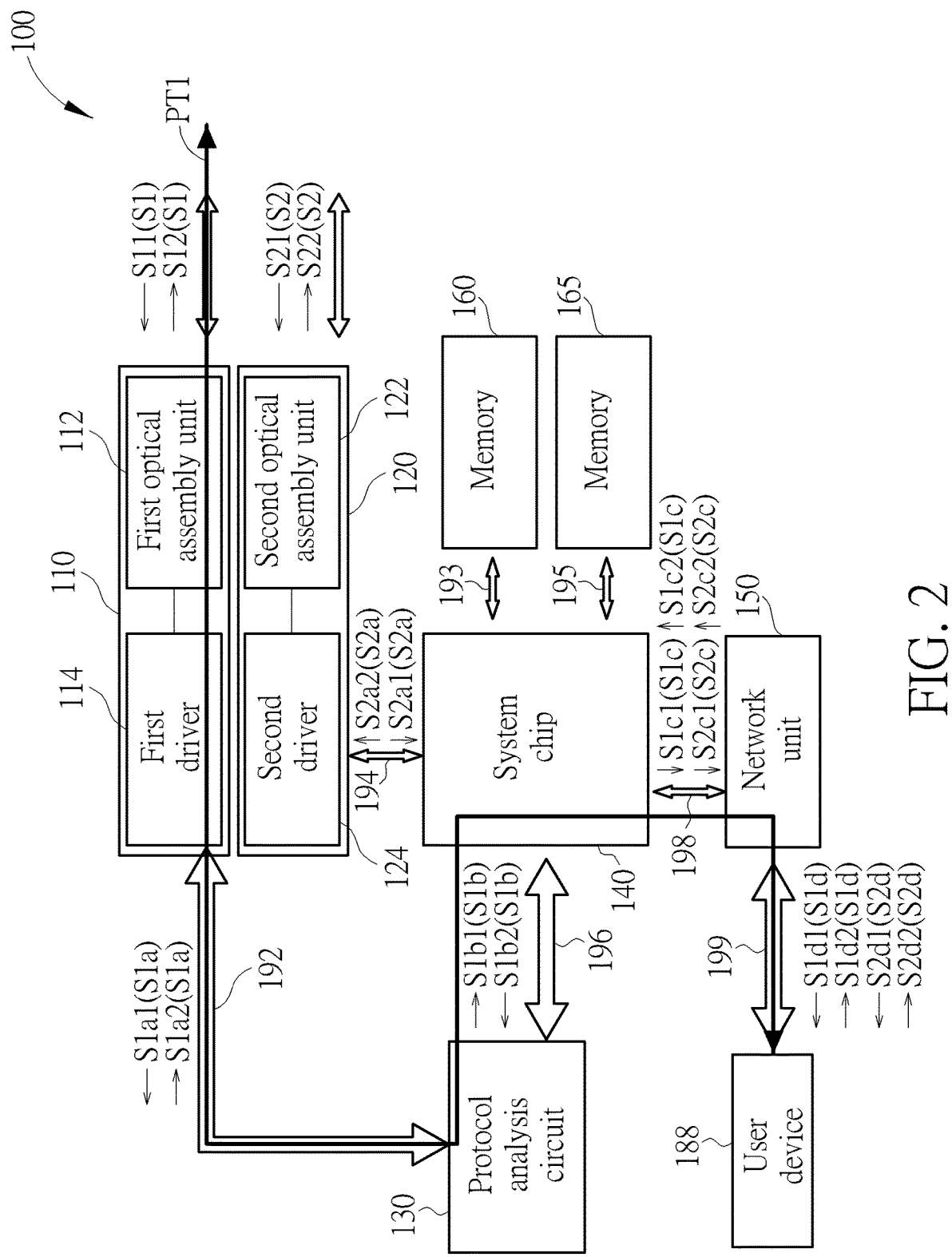
FIG. 2 illustrates a path of processing the signals related to the first optical signal in FIG. 1 according to an embodiment.

FIG. 2 illustrates a path PT1 of processing the signals related to the first optical signal S1 in FIG. 1 according to an embodiment.

As shown by the path PT1, when the signal processing system 100 receives the first optical signal S1, the first transceiver unit 110 can convert the first optical signal S1 to the first electrical signal S1$a$. The protocol analysis circuit 130 can generate the analysis signal S1$b$ according to the first electrical signal S1$a$. The system chip 140 can generate the first operation signal S1$c$ according to the analysis signal S1$b$. The network unit 150 can generate the first network signal S1$d$ according to the first operation signal S1$c$ and transmit the first network signal S1$d$ to the user device 188.

In FIG. 2, the signal S1$a$1 can be generated according to the signal S11. The signal S1$b$1 can be generated according to the signal S1$a$1. The signal S1$c$1 can be generated according to the signal S1$b$1. The signal S1$d$1 can be generated according to the signal S1$c$1. In detail, when the first transceiver unit 110 receives the signal S11, the signal S1$a$1 can be generated according to the signal S11, and the signal S1$a$1 can be transmitted to the protocol analysis circuit 130 through the first optical network unit interface 192. When the protocol analysis circuit 130 receives the signal S1$a$1, the signal S1$b$1 can be generated according to the signal S1$a$1, and the signal S1$b$1 can be transmitted to the system chip 140 through the port physical layer interface 196. When the system chip 140 receives the signal S1$b$1, the signal S1$c$1 can be generated according to the signal S1$b$1, and the signal S1$c$1 can be transmitted to the network unit 150 through the first network interface 198. When the network unit 150 receives the signal S1$c$1, the signal S1$d$1 can be generated according to the signal S1$c$1, and the signal S1$d$1 can be transmitted to the user device 188 through the second network interface 199.

As shown by the path PT1, when the network unit 150 receives the first network signal S1$d$ from the user device 188, the network unit 150 can generate the first operation signal S1$c$ according to the first network signal S1$d$. The system chip 140 can generate the analysis signal S1$b$ according to the first operation signal S1$c$. The protocol analysis circuit can generate the first electrical signal S1$a$ according to the analysis signal S1$b$. The first transceiver unit 110 can covert the first electrical signal S1$a$ to the first optical signal S1.

In FIG. 2, the signal S1$c$2 can be generated according to the signal S1$d$2. The signal S1$b$2 can be generated according to the signal S1$c$2. The signal S1$a$2 can be generated according to the signal S1$b$2. The signal S12 can be generated according to the signal S1$a$2. In detail, the user device 188 can transmit the signal S1$d$2 to the network unit 150 through the second network interface 199. The network 150 can receive the signal S1$d$2, generate the signal S1$c$2 according to the signal S1$d$2, and transmit the signal S1$c$2 to the system chip 140 through the first network interface 198. The system chip 140 can receive the signal S1$c$2, generate the signal S1$b$2 according to the signal S1$c$2, and transmit the signal S1$b$2 to the protocol analysis circuit 130 through the port physical layer interface 196. The protocol analysis circuit 130 can receive the signal S1$b$2, generate the signal S1$a$2 according to the signal S1$b$2, and transmit the signal S1$a$2 to the first transceiver unit 110 through the first optical network unit interface 192. The first transceiver unit 110 can receive the signal S1$a$2, generate the signal S12 according to the signal S1$a$2, and transmit the signal S12.

As shown by the path PT1, when the signal processing system 100 is used to process the signals related to the first optical signal S1, the protocol analysis circuit 130 can be used to perform encryption, decryption and classification-and-forwarding without using the memory 160 to perform a queue operation.

Figure 3:
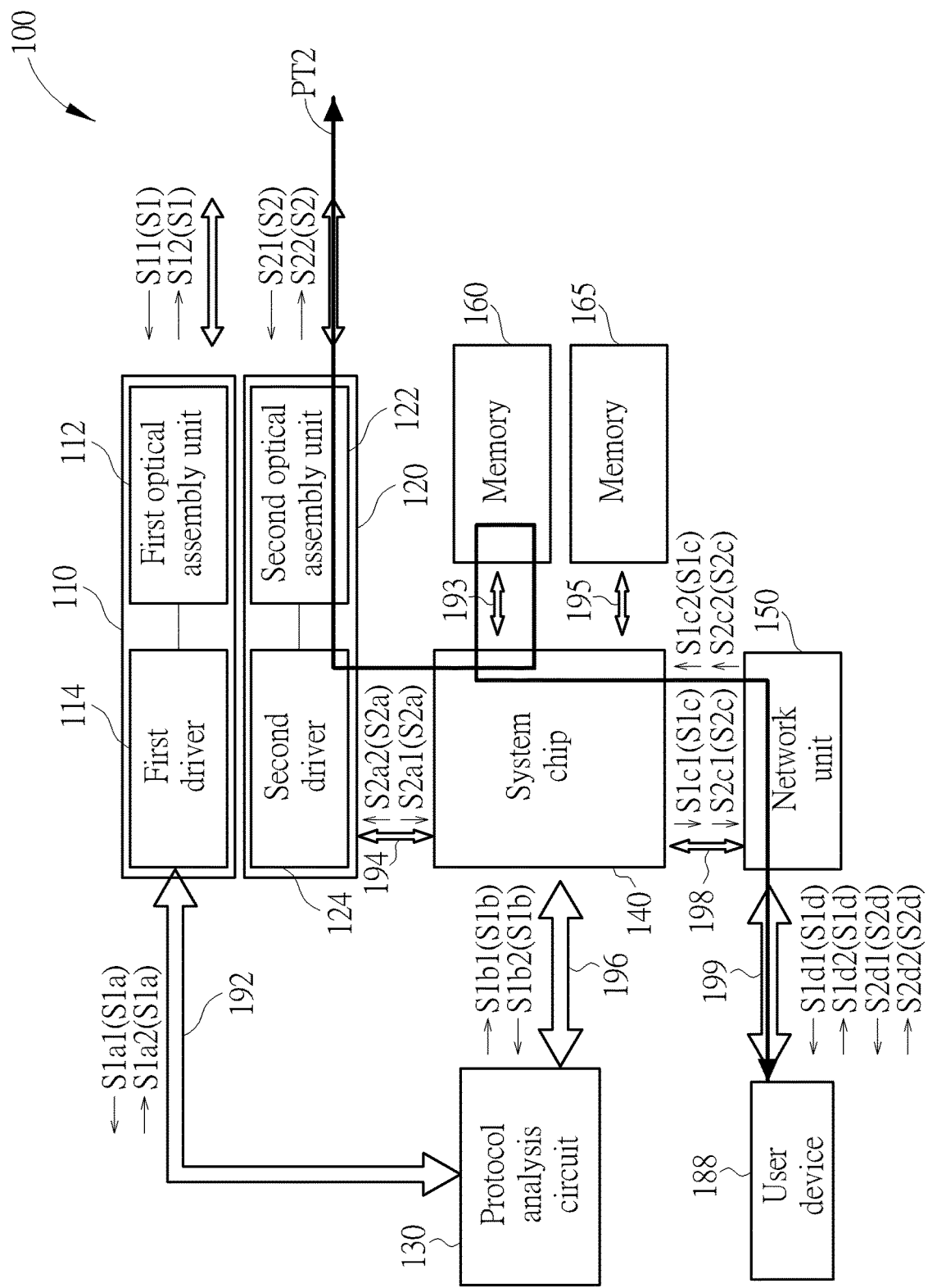
FIG. 3 illustrates another path of processing the signals related to the second optical signal in FIG. 1 according to an embodiment.

FIG. 3 illustrates a path PT2 of processing the signals related to the second optical signal S2 in FIG. 1 according to an embodiment.

As shown by the path PT2, when the signal processing system 100 receives the second optical signal S2, the second transceiver unit 120 can convert the second optical signal S2 to the second electrical signal S2$a$. The system chip 140 can receive the second electrical signal S2$a$ to process the second electrical signal S2$a$. The memory 160 can perform a queue operation for the packets and tasks related to the second electrical signal S2$a$. After the system chip 140 processes the second electrical signal S2$a$, the system chip 140 can generate the second operation signal S2$c$. The network unit 150 can generate the second network signal S2$d$ according to the second operation signal S2$c$, and transmit the second network signal S2$d$ to the user device 188.

In FIG. 3, the signal S2$a$1 can be generated according to the signal S21, the signal S2$c$1 can be generated according to the signal S2$a$1, and the signal S2$d$1 can be generated according to the signal S2$c$1.

In detail, the second transceiver unit 120 can receive the signal S21, generate the signal S2$a$1 according to the signal S21, and transmit the signal S2$a$1 to the system chip 140 through the second optical network unit interface 194. The system chip 140 can receive the signal S2$a$1, process the signal S2$a$1, use the memory 160 to perform a queue operation, generate the signal S2$c$1 according to the signal S2$a$1, and transmit the signal S2$c$1 to the network unit 150 through the first network interface 198. The network unit 150 can receive the signal S2$c$1, generate the signal S2$d$1 according to the signal S2c1, and transmit the signal S2d1 to the user device 188 through the second network interface 199.

As shown by the path PT2, when the network unit 150 receives the second network signal S2d from the user device 188, the network device 150 can generate the second operation signal S2c according to the second network signal S2d. The system chip 140 can receive the second operation signal S2c, process the second operation signal S2c, and use the memory 160 to perform a queue operation for the packets and tasks related to the second operation signal S2c. After the system chip 140 processes the second operation signal S2c, the system chip 140 can generate the second electrical signal S2a accordingly. Then, the second transceiver unit 120 can convert the second electrical signal S2a to the second optical signal S2.

In FIG. 3, the signal S2c2 can be generated according to the signal S2d2, the signal S2a2 can be generated according to the signal S2c2, and the signal S22 can be generated according to the signal S2a2.

In detail, the user device 188 can transmit the signal S2d2 to the network unit 150 through the second network interface 199. After the network unit 150 receives the signal S2d2, the network unit 150 can generate the signal S2c2 according to the signal S2d2, and transmit the signal S2c2 to the system chip 140 through the first network interface 198. After the system chip 140 receives the signal S2c2, the system chip 140 can process the signal S2c2, use the memory 160 to perform a queue operation, generate the signal S2a2 according to the signal S2c2, and transmit the signal S2a2 to the second transceiver unit 120 through the second optical network unit interface 194. After the second transceiver unit 120 receives the signal S2a2, the second transceiver unit 120 can generate the signal S22 according to the signal S2a2, and transmit the signal S22.

As shown by the path PT2, when the signal processing system 100 is used to process the signals related to the second optical signal S2, the protocol analysis circuit 130 is not used, and the memory 160 is used to perform the queue operation.

Figure 4:
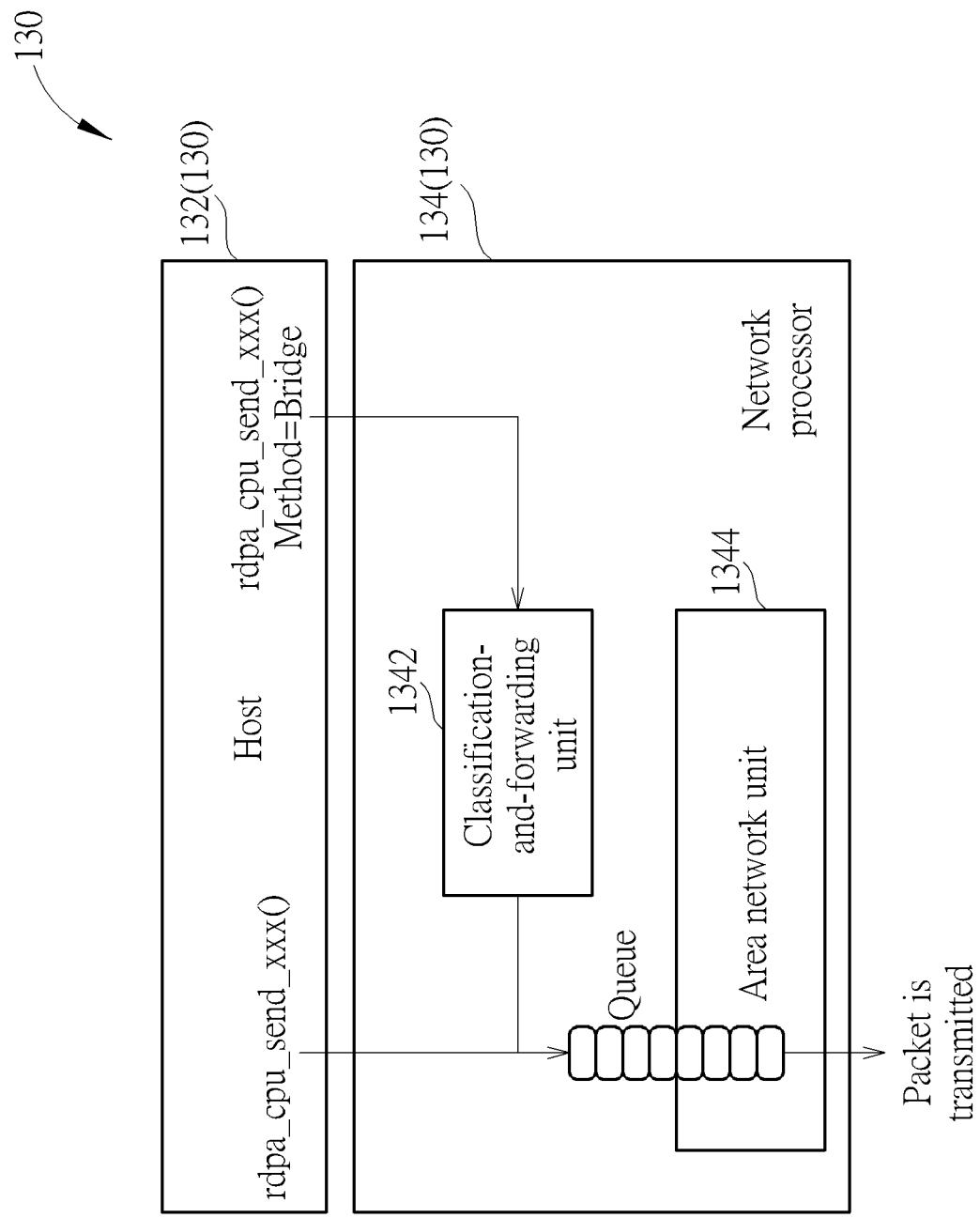
FIG. 4 illustrates the operations of the protocol analysis circuit in FIG. 1 according to an embodiment.

FIG. 4 illustrates the operations of the protocol analysis circuit 130 in FIG. 1 according to an embodiment. The protocol analysis circuit 130 can include a host 132 and a network processor 134. The network processor 134 can include a classification-and-forwarding unit 1342 and an area network unit 1344. When an internet protocol packet (TP packet, referred to as packet in the text) carried by an electrical signal reaches the protocol analysis circuit 130, the packet can be transmitted to the network processor 134 through the host 132. According to the descriptions of the low-level assembly language in the packet, the packet can be transmitted to the classification-and-forwarding unit 1342 or the area network unit 1344.

If the packet is transmitted to the classification-and-forwarding unit 1342, the protocol analysis circuit 130 can perform a classification-and-forwarding operation, arrange the packet in a queue, and then transmit the packet through the area network unit 1344. As shown in FIG. 4, the corresponding low-level assembly language may be rdpa_cpu_send_xxx( ) Method=Bridge. This is an example, and embodiments are not limited thereto.

If the packet is not transmitted to the classification-and-forwarding unit 1342, the protocol analysis circuit 130 can arrange the packet in a queue, and then transmit the packet through the area network unit 1344. As shown in FIG. 4, the corresponding low-level assembly language may be rdpa_cpu_send_xxx( ). This is an example, and embodiments are not limited thereto.

The abovementioned queue can be a random queue. The area network unit 1344 can assign ports of a wide area network (WAN) and/or a local area network (LAN) for transmitting packets.

In FIG. 4, the classification-and-forwarding unit 1342 and the area network unit 1344 of the network processor 134 can be implemented using appropriate hardware and/or software. The classification-and-forwarding unit 1342 and the area network unit 1344 can be separated as different units or integrated as one unit.

As shown in FIG. 2 and FIG. 4, the protocol analysis circuit 130 can be used to perform an encryption operation and a decryption operation to process the analysis signal S1b and the first electrical signal S1a corresponding to the first optical signal S1. The protocol analysis circuit 130 can be used to perform a classification-and-forwarding operation to process the analysis signal S1b and the first electrical signal S1a corresponding to the first optical signal S1.

Figure 5:
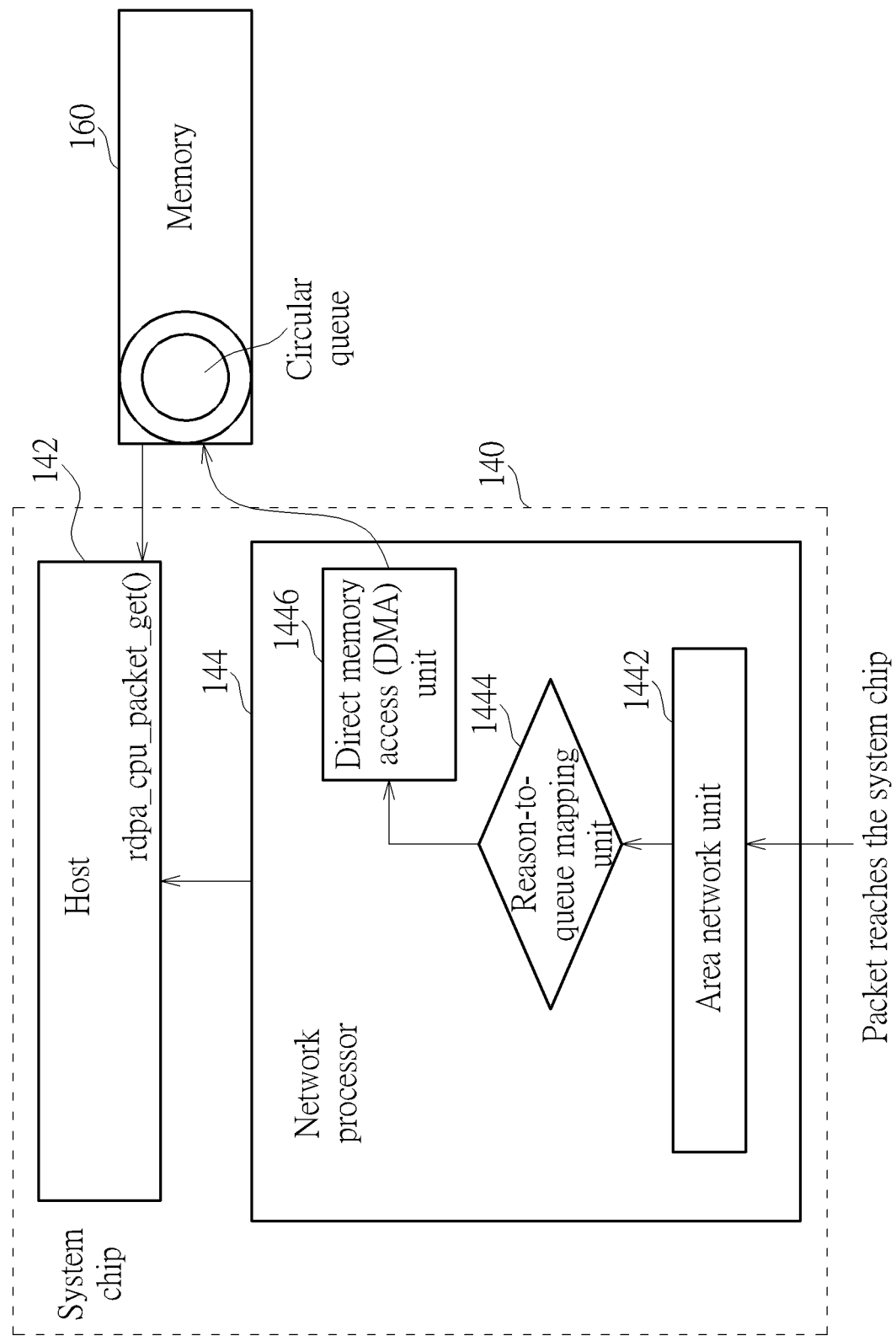
FIG. 5 illustrates the operations of the system chip and the memory in FIG. 1 according to an embodiment.

FIG. 5 illustrates the operations of the system chip 140 and the memory 160 in FIG. 1 according to an embodiment. As shown in FIG. 5, the system chip 140 can include a host 142 and a network processor 144. The network processor 144 can include an area network unit 1442, a reason-to-queue mapping unit 1444 and a direct memory access (DMA) unit 1446. When a packet arrives the system chip 140, the packet can be accessed through the area network unit 1442, and then the packet can be transmitted to the reason-to-queue mapping unit 1444. The area network unit 1442 can access information of ports of a wide area network (WAN) and/or a local area network (LAN) for transmitting the packet. The reason-to-queue mapping unit 1444 can determine whether the packet is transmitted to the direct memory access unit 1446 or the host 142.

If the packet is transmitted to the host 142, the packet is processed without using the memory 160. For example, in FIG. 2, the packet related to the first optical signal S1 is processed without using the memory 160.

If the packet is transmitted to the direct memory access (DMA) unit 1446, the memory 160 can be used to perform a queue operation to arrange and schedule the packet and related tasks. For example, the queue operation of the memory 160 can be a ring queue for scheduling and buffering related data. After performing the queue operation in the memory 160, the packet can be transmitted to the host 142 of the system chip 140 so as to transmit the packet from the system chip 140 to outside of the system chip 140. For example, the low-level assembly language corresponding to the operation can be rdpa_cpu_packet_get( ). This is an example, and embodiments are not limited thereto. As shown in FIG. 3 and FIG. 5, the packets related to the second optical signal S2 can be processed using the memory 160.

In FIG. 5, the area network unit 1442, the reason-to-queue mapping unit 1444 and the direct memory access unit 1446 can be implemented using appropriate hardware and/or software. The area network unit 1442, the reason-to-queue mapping unit 1444 and the direct memory access unit 1446 can be separated as different units or integrated as one unit.

As mentioned above, the queue operation performed with the memory 160 is related to the second optical signal S2, the second electrical signal S2a and the second operation signal S2c. The queue operation performed with the memory 160 is not related to the first optical signal S1, the first electrical signal S1a and the first operation signal S1c.

Figure 6:
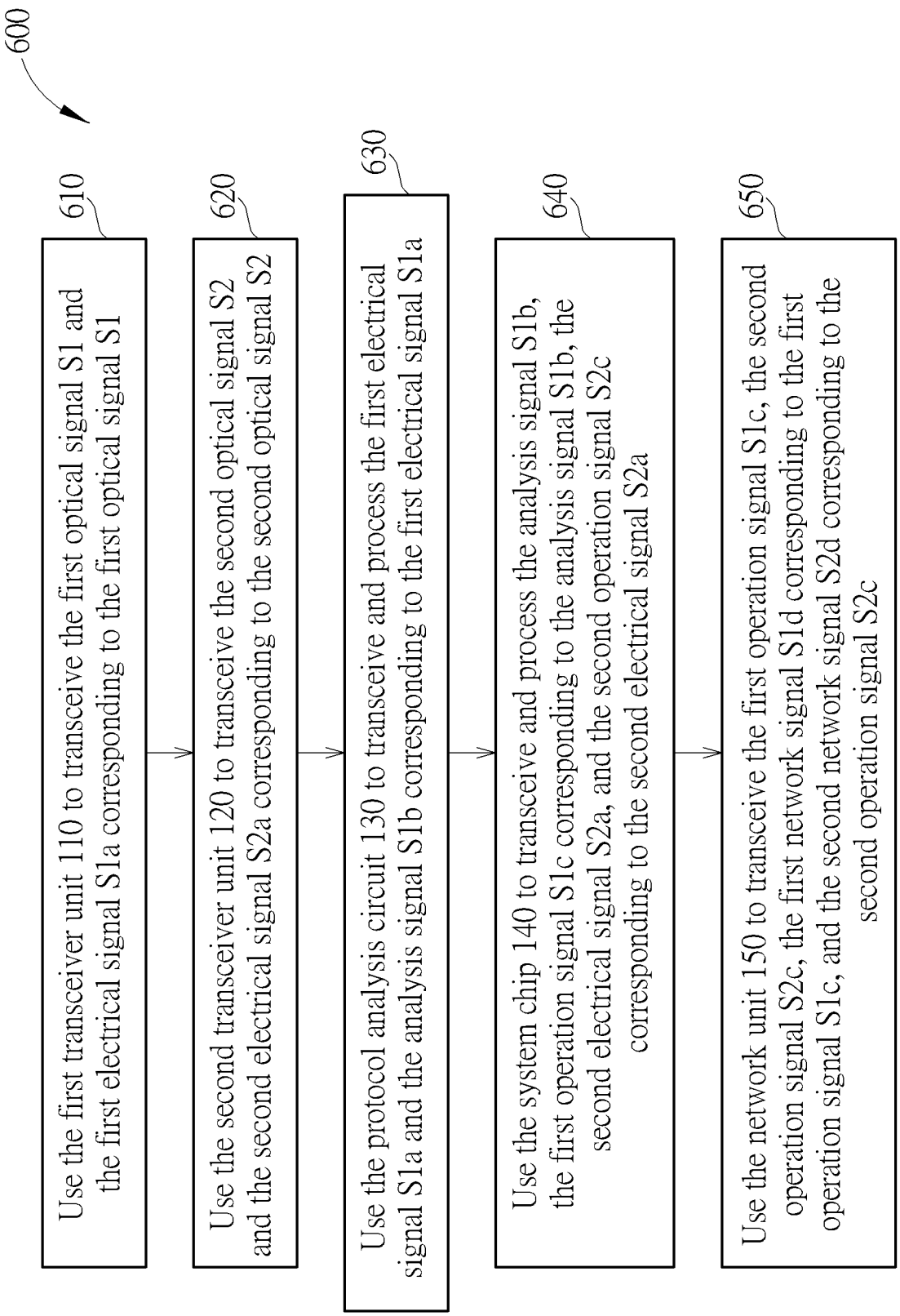
FIG. 6 illustrates a flow chart of a signal processing method for the signal processing system in FIG. 1 according to an embodiment.

FIG. 6 illustrates a flow chart of a signal processing method 600 for the signal processing system 100 according to an embodiment. As shown in FIG. 1 and FIG. 6, the signal processing method 600 can include following steps.

Step 610: use the first transceiver unit 110 to transceive the first optical signal S1 and the first electrical signal S1a corresponding to the first optical signal S1;

Step 620: use the second transceiver unit 120 to transceive the second optical signal S2 and the second electrical signal S2a corresponding to the second optical signal S2;

Step 630: use the protocol analysis circuit 130 to transceive and process the first electrical signal S1a and the analysis signal S1b corresponding to the first electrical signal S1a;

Step 640: use the system chip 140 to transceive and process the analysis signal S1b, the first operation signal S1c corresponding to the analysis signal S1b, the second electrical signal S2a, and the second operation signal S2c corresponding to the second electrical signal S2a; and Step 650: use the network unit 150 to transceive the first operation signal S1c, the second operation signal S2c, the first network signal S1d corresponding to the first operation signal S1c, and the second network signal S2d corresponding to the second operation signal S2c.

In FIG. 6, the sequence and the content of the steps can be flexibly adjusted according to requirements. For example, Step 610 can be performed before or after Step 620, or Steps 610 and 620 can be performed concurrently. For example, if the signal processing system 100 receives the first network signal S1d and/or the second network signal S2d to generate at least one of the first optical signal S1 and the second optical signal S2, Step 650 can be performed first. For example, if the signal processing system 100 does not receive a signal related to the first optical signal S1, the steps related to the first optical signal S1 may be omitted selectively. For example, if the signal processing system 100 does not receive a signal related to the second optical signal S2, the steps related to the second optical signal S2 may be omitted selectively.

In summary, in the signal processing system 100, the circuits related to the analysis signal S1b and the first electrical signal S1a corresponding to the first optical signal S1 can be embedded in the protocol analysis circuit 130, so the system chip 140 and the network unit 150 can be shared to process the signals related to the first optical signal S1 and the second optical signal S2. Hence, it is unnecessary to use two system chips, two network units and two sets of memories to process signals of two different bit rates. By using the protocol analysis circuit 130, the first optical signal S1 of a higher bit rate (e.g. 10 Gbps) can be processed without using the memory 160 to perform the queue operation, thus reducing the memory requirement. In addition, since there is no need to use two system chips, two network units and two sets of memories to process signals of two different bit rates, power consumption and device size can be reduced. For example, if the signal processing system 100 is not used, the power consumption of a system processing signals of two different bit rates should be at least 200% of the power consumption of a system processing signals of only one bit rate. However, by using the signal processing system 100 and the signal processing method 600, the power consumption can be increased by only 4%. For example, the power consumption of processing signals related to one bit rate can be 10 watts, and the power consumption of processing signals related to two different bit rates can be 10.4 watts rather than 20 watts by using the signal processing system 100 and the signal processing method 600. As a result, the signal processing system 100 and the signal processing method 600 are useful for simplifying hardware structure and reducing power consumption and device size.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing system comprising:
   a first transceiver unit configured to transceive a first optical signal and a first electrical signal;
   a second transceiver unit configured to transceive a second optical signal and a second electrical signal;
   a protocol analysis circuit coupled to the first transceiver unit, and configured to process the first electrical signal and an analysis signal and transceive the first electrical signal and the analysis signal;
   a system chip coupled to the protocol analysis circuit and the second transceiver unit, and configured to process the analysis signal, the second electrical signal, a first operation signal and a second operation signal, and transceive the analysis signal, the second electrical signal, the first operation signal and the second operation signal; and
   a network unit coupled to the system chip and a user device, and configured to transceive the first operation signal and the second operation signal, and transceive a first network signal and a second network signal between the network unit and the user device;
   wherein the first electrical signal, the analysis signal, the first operation signal and the first network signal are corresponding to the first optical signal, and the second electrical signal, the second operation signal and the second network signal are corresponding to the second optical signal.

2. The signal processing system of claim 1, wherein:
   the first transceiver unit comprises:
      a first optical assembly unit configured to transceive the first optical signal; and
      a first driver coupled to the first optical assembly unit, and configured to convert the first optical signal to the first electrical signal and convert the first electrical signal to the first optical signal; and
   the second transceiver unit comprises:
      a second optical assembly unit configured to transceive the second optical signal; and
      a second driver coupled to the second optical assembly unit, and configured to convert the second optical signal to the second electrical signal and convert the second electrical signal to the second optical signal.

3. The signal processing system of claim 1, further comprising:
   a memory coupled to the system chip and configured to perform a queue operation related to the second electrical signal and the second operation signal.

4. The signal processing system of claim 3, wherein the memory is a dynamic random access memory.

5. The signal processing system of claim 1, wherein the first optical signal is corresponding to a first bit rate, and the second optical signal is corresponding to a second bit rate lower than the first bit rate.

6. The signal processing system of claim 1, wherein the protocol analysis circuit is configured to perform an encryption operation and a decryption operation to process the analysis signal and the first electrical signal.

7. The signal processing system of claim 1, wherein the protocol analysis circuit is configured to perform a classification-and-forwarding operation to process the analysis signal and the first electrical signal.

8. The signal processing system of claim 1, further comprising:
a first optical network unit interface disposed between the first transceiver unit and the protocol analysis circuit;
a second optical network unit interface disposed between the second transceiver unit and the system chip;
a port physical layer interface disposed between the protocol analysis circuit and the system chip;
a first network interface disposed between the system chip and the network unit; and
a second network interface disposed between the network unit and the user device.

9. The signal processing system of claim 1, wherein the network unit is an Ethernet unit.

10. A signal processing method for a signal processing system, the signal processing system comprising a first transceiver unit, a second transceiver unit, a protocol analysis circuit, a system chip and a network unit, the signal processing method comprising:
using the first transceiver unit to transceive a first optical signal and a first electrical signal corresponding to the first optical signal;
using the second transceiver unit to transceive a second optical signal and a second electrical signal corresponding to the second optical signal;
using the protocol analysis circuit to transceive the first electrical signal and an analysis signal corresponding to the first electrical signal, and process the first electrical signal and the analysis signal;
using the system chip to transceive the analysis signal, a first operation signal corresponding to the analysis signal, the second electrical signal, and a second operation signal corresponding to the second electrical signal, and process the analysis signal, the first operation signal, the second electrical signal and the second operation signal; and
using the network unit to transceive the first operation signal, the second operation signal, a first network signal corresponding to the first operation signal, and a second network signal corresponding to the second operation signal.

11. The signal processing method of claim 10, wherein the first optical signal is corresponding to a first bit rate, and the second optical signal is corresponding to a second bit rate lower than the first bit rate.

12. The signal processing method of claim 10, wherein:
the protocol analysis circuit is configured to perform an encryption operation and a decryption operation to process the analysis signal and the first electrical signal.

13. The signal processing method of claim 10, wherein:
the protocol analysis circuit is configured to perform a classification-and-forwarding operation to process the analysis signal and the first electrical signal.

14. The signal processing method of claim 10, wherein:
the signal processing system further comprises a memory; and
the signal processing method further comprises using the memory to perform a queue operation related to the second electrical signal and the second operation signal.

* * * * *